Patented Dec. 22, 1936                                                             2,065,196

UNITED STATES PATENT OFFICE 2,065,196

METHOD FOR PURIFICATION OF ANTITOXINS AND THE LIKE

Ivan Alexandrovich Parfentjev, Pearl River, N. Y.

No Drawing. Application October 9, 1934,
Serial No. 747,532

11 Claims. (Cl. 167—78)

This invention relates to a method for the selective digestion of the various proteins contained in serum, plasma, or other body fluids, and is particularly concerned with the application of this method to the purification of materials containing antibodies.

Serum from which antitoxins and the like are obtained contains several different proteins which are principally considered as albumins, euglobulins and pseudoglobulins. The antibodies contained in the serum are ordinarily associated almost entirely with the pseudoglobulin. Hence in any method of purifying and concentrating serum solution containing valuable antibodies, it is considered desirable to remove the albumin and euglobulin as completely as possible without affecting the pseudoglobulin with its associated antibodies.

The antibodies in the serum of a horse or other animal immunized against the toxins of disease-producing organisms are called antitoxins. Antitoxins are always associated with the globulin fractions and chiefly with the pseudoglobulin fraction. The antibodies produced by immunizing a horse against the organisms themselves, which produce disease, are referred to as antibacterial and antivirus antibodies and are likewise associated with the globulin fractions.

The customary method of refining and concentrating antitoxins has entailed making fractional precipitations of the different proteins contained in the native antitoxic serum, such precipitations being made by the use of various inorganic salts in various concentrations. The salt most commonly used for this purpose is ammonium sulphate.

Thus, with ammonium sulphate used in a concentration of 30 to 33% of a saturated solution, a globulin precipitate containing very little antitoxin is obtained. This fraction is generally referred to as the euglobulin fraction and is commonly discarded. The filtrate resultant from this first precipitation is then treated with more ammonium sulphate until the concentration is 50% by volume of saturated ammonium sulphate solution. At this concentration, a further precipitation is obtained which is commonly referred to as the pseudoglobulin fraction and which contains practically all of the antitoxin. There remains in solution all of the albumin fraction originally present in the serum, and this solution is substantially free from antitoxins, so that in the case of the second precipitation, the filtrate is discarded and the precipitate saved. The precipitate is redissolved and this solution is used as such.

So far, all known different antitoxins for whatever disease are associated with this same pseudoglobulin fraction of the immune serum, and, in general, any method of purification that has been found effective for one kind of antitoxin has likewise been found applicable in principle for every other known antitoxin, including diphtheria antitoxin, tetanus antitoxin, hemolytic streptococcus antitoxin, staphylococcus antitoxin, perfringens antitoxin, vibrion septique antitoxin, oedematiens antitoxin, histolyticus antitoxin, sordelli antitoxin, botulinus type I antitoxin, botulinus type II antitoxin, and the like.

I have discovered that it is possible to purify and concentrate serum or like solution containing valuable antibodies by treating the solution with proteolytic enzymes under such conditions as to prevent any substantial destruction of the antibodies. In this way, I am able to digest the valueless albumin fraction, practically completely, with substantially no destruction of antibodies contained in the globulin fraction. My process further contemplates separation of the euglobulin fraction, which is practically free from antibodies, from the pseudoglobulin fraction with which the antibodies are principally associated.

In one application of my method, the fraction of serum proteins commonly considered as albumins digest first and to such a degree that the products of digestion are dialyzable; that fraction commonly referred to as euglobulins is partially digested and the remainder is precipitated by the acid present, the digestion being carried out under acid conditions (pH about 4.2); and that fraction referred to as pseudoglobulins is least acted upon by the digestive process and at least in part remains in solution retaining nearly all its original antibody activity.

The following is a specific example of one method of carrying out my procedure in the purification of diphtheria antitoxin. It is understood that the example is given merely by way of illustration and not in limitation.

A suitable quantity of diphtheria antitoxin serum is diluted with three times its volume of saline solution. To this mixture I add an amount of U. S. P. pepsin equivalent to about 1% based on the total volume of liquid. The hydrogen ion concentration of the mixture is then adjusted to a pH of about 4.2 by adding a suitable acid or alkali. This adjustment of pH is preferably made as soon as possible after the addition of the pepsin. Thereupon the entire mixture is digested for about two days at a temperature of about 37° C.

The digested material is filtered to separate solid materials (euglobulin, etc.) from the liquid and the separated liquid is further treated by an ultra-filtration method. One manner of carrying out the ultra-filtration involves filtration through a suitable ceramic cone coated with collodion. As a specific illustration, 16 liters of the liquid are placed in the cone and subjected to filtration. After the ultra-filtration operation is complete there remains about one liter or less of liquid in the cone. This latter liquid is a very transparent, clear product forming no precipitate on standing. This product is a highly purified, concentrated diphtheria antitoxin having an average potency of eight times that of the original material, this being twice as potent as the antitoxin prepared by the customary ammonium sulphate method.

The details of the described procedure may be varied within certain limits, as may be indicated by experience. The finished antitoxin may be prepared by digesting, in accordance with the present method, anti-diphtheric blood, serum or plasma. My method also may be applied to the further purification and concentration of antitoxin prepared by any other method, e. g., the ammonium sulphate method.

One of the outstanding features of my process is that when the pepsin or similar enzyme is added first, and in proper concentration, it protects the antibody activity against destruction by acid subsequently added. I have shown this to be true by adding the same amount of acid to similar antibody solution to which pepsin had not previously been added, and in this case the antibody destruction is considerably greater. Further, under the conditions of my process, the globulin fraction is more resistant to digestion than the albumin fraction, so that practically a total destruction of the albumins may be achieved without there being enough digestive action on the pseudoglobulin fraction to destroy an appreciable amount of its antibody activity. While I prefer to add the enzyme to the serum prior to the adjustment of acidity, it will be obvious that my process can be carried out by adding the enzyme with the proper amount of acid to the serum simultaneously. It is also possible to adjust the acidity to the desired point, not exceeding pH 4, prior to the addition of the enzyme, provided that the enzyme is added to the acidified serum very shortly after acidification, since any considerable delay would cause the acid to destroy a substantial amount of the antibodies. Thus it is apparent that addition of the enzyme at or after acidification can be made so as to avoid substantial destruction of the antibodies and such modifications are clearly within the purview of the present invention.

It is best that the digestion be carried out in diluted solutions since with too high concentrations, the proteolytic enzymes may fail to protect the antibodies sufficiently. Ordinarily this dilution is to the extent of about four times the original volume. The hydrogen ion concentration is adjusted by adding a corresponding amount of acid or alkali, as may be needed, and a pH of 4 to 5 is generally suitable. The time of digestion may be varied, depending upon variations in dilution, pH, temperature and the like.

If the digestion is sufficiently complete, a precipitated undigested portion of the serum protein is separated from the solution which contains the soluble products of digestion and a residual portion of the protein associated with the antitoxin. The antitoxin solution is then concentrated by any suitable method, such as by ultra-filtration, previously described, dialysis and evaporation, precipitation, absorption or the like, until a suitable purification and concentration of antitoxins is established.

In place of the proteolytic enzyme, pepsin, already discussed, I may use other suitable enzymes, such as papain, renin, trypsin, and the like, or suitable mixtures of the various enzymes. The enzymes, under the conditions prevailing in my procedure, protect the diphtheria antitoxins or other antibodies from destruction. This is true even though the digestion is carried out in an acid medium which, in the absence of the enzyme, would destroy most, if not all, of the antitoxins. Further, when antitoxic serum is submitted to the influence of the proteolytic enzymes, in accordance with my method, the albumin fraction is more quickly digested than the globulin fraction. It will be obvious that this is a desirable result since all known antitoxins are associated with the pseudoglobulin fraction rather than with the albumin fraction. This process is, therefore, applicable to the purification of all known antitoxins, such as those mentioned above.

The antitoxins prepared according to my method are used as such for injection into animals or human beings for protecting them against the corresponding toxin. It is evident that the high potency of my material permits the injection of smaller amounts to obtain the same results as were previously obtained with larger amounts of the usual antitoxins. Likewise larger amounts of antibodies may be injected by the use of similar volumes of my products, as compared with the usual antitoxins.

This process is applicable, as noted above, to the purification of all known antitoxins, including diphtheria antitoxin, tetanus antitoxin, erysipelas antitoxin, staphylococcus antitoxin, gas gangrene antitoxins, and the like. It is also applicable to the antitoxins known as antivenoms, such as anti-crotalus venom, anti-cobra venom and anti-moccasin venom, and the like. It may also be used in the treatment of the antibacterial serums such as antidistemper serum, anti-pneumococcic serum, antimeningococcic serum, antistaphylococcic serum, antidysenteric serum (both antibacterial and antitoxic), and the like.

Other suitable changes may be made without departing from the spirit and scope of my invention except as defined in the appended claims.

Throughout the specification and claims I have used the term "pH" to describe hydrogen-ion concentration, since the hydrogen-ion concentration is customarily used to measure acidity. Thus when I describe my solutions as being mildly acid and not in excess of pH 4, it is to be understood that this is intended to cover the range of acidity from pH 4 and approaching to neutrality.

What I claim is:—

1. A method of purifying antitoxin contained in a solution of serum proteins which comprises adding a proteolytic enzyme to such solution and digesting the greater portion of the serum proteins with the enzyme without substantial destruction of the antitoxin, the digestion being carried out under acid conditions but at an acidity not greater than that corresponding to pH 4.

2. The method of claim 1 in which the acidity of the solution is adjusted after the addition of the enzyme.

3. The method of claim 1 in which the solution is adjusted to a pH of 4 to 5 after the addition of the enzyme.

4. The method of claim 1 in which the enzyme comprises pepsin.

5. The method of purifying diphtheria antitoxin contained in a solution of serum proteins which comprises adding a proteolytic enzyme to the solution, adjusting the acidity of the solution to a pH between 4 and 5, and digesting the bulk of the serum proteins without substantial destruction of the antitoxin.

6. The method of claim 5 in which the acidity is adjusted to a pH of 4.2.

7. The method of claim 5 in which the proteolytic enzyme comprises pepsin.

8. The method of claim 1 in which the solution is diluted with a saline solution to about four times its original volume prior to the addition of the enzyme.

9. The method of claim 5 in which the solution is diluted with a saline solution to about four times its original volume prior to the addition of the enzyme.

10. The process of purifying antitoxin contained in a solution of serum proteins which comprises diluting the solution to a volume greater than twice the original volume, adding a proteolytic enzyme to the diluted solution, adjusting the acidity of the liquid to a pH between about 4 and 5, digesting the bulk of the serum proteins with the enzyme without substantial destruction of the antitoxin, removing any precipitated undigested portion of the serum proteins which separates from the antitoxin solution, and concentrating the antitoxin solution.

11. The method of claim 10 in which the proteolytic enzyme comprises pepsin.

IVAN ALEXANDROVICH PARFENTJEV.